(12) United States Patent  (10) Patent No.: US 8,755,693 B2
Mazzochette et al.  (45) Date of Patent: Jun. 17, 2014

(54) BI-DIRECTIONAL, COMPACT, MULTI-PATH AND FREE SPACE CHANNEL REPLICATOR

(75) Inventors: Joseph Mazzochette, Cherry Hill, NJ (US); Edward J. MacMullen, New Egypt, NJ (US); Jerome Lomurno, Moorestown, NJ (US)

(73) Assignee: Eastern Optx, Inc., Moorestown, NJ (US)

( * ) Notice: Subject to any disclaimer, the term of this patent is extended or adjusted under 35 U.S.C. 154(b) by 188 days.

(21) Appl. No.: 13/468,393

(22) Filed: May 10, 2012

(65) Prior Publication Data

US 2012/0294621 A1  Nov. 22, 2012

Related U.S. Application Data

(60) Provisional application No. 61/486,529, filed on May 16, 2011.

(51) Int. Cl.
 *H04B 10/00* (2013.01)
(52) U.S. Cl.
 USPC ........................................... 398/115; 398/116
(58) Field of Classification Search
 USPC .................................. 398/115–117
 See application file for complete search history.

(56) References Cited

U.S. PATENT DOCUMENTS

| | | | | |
|---|---|---|---|---|
| 4,156,106 A | * | 5/1979 | Bumgardner | 370/248 |
| 4,736,463 A | * | 4/1988 | Chavez | 359/107 |
| 5,109,449 A | * | 4/1992 | Newberg et al. | 385/46 |
| 5,177,488 A | * | 1/1993 | Wang et al. | 342/167 |
| 5,400,162 A | * | 3/1995 | Newberg et al. | 398/45 |
| 5,414,433 A | * | 5/1995 | Chang | 342/375 |
| 5,518,400 A | * | 5/1996 | Otoide et al. | 434/4 |
| 5,721,556 A | * | 2/1998 | Goutzoulis | 342/375 |
| 5,751,242 A | * | 5/1998 | Goutzoulis et al. | 342/158 |
| 6,965,739 B2 | * | 11/2005 | Seto et al. | 398/183 |
| 7,085,497 B2 | * | 8/2006 | Tiemann et al. | 398/107 |
| 7,148,812 B2 | * | 12/2006 | Baggs | 340/853.7 |
| 7,209,079 B2 | * | 4/2007 | Easton | 342/375 |
| 7,388,892 B2 | * | 6/2008 | Nishiyama et al. | 372/38.02 |
| 7,389,053 B1 | * | 6/2008 | Ilchenko et al. | 398/183 |
| 7,474,460 B2 | * | 1/2009 | Fujiwara et al. | 359/344 |
| 7,660,491 B2 | * | 2/2010 | Thaniyavarn | 385/3 |
| 7,734,180 B2 | * | 6/2010 | Maeda et al. | 398/79 |
| 7,782,250 B2 | * | 8/2010 | Shih et al. | 342/172 |
| 7,796,891 B2 | * | 9/2010 | Lee et al. | 398/115 |
| 7,898,464 B1 | * | 3/2011 | Anderson et al. | 342/54 |
| 8,041,222 B2 | * | 10/2011 | Lee et al. | 398/115 |
| 8,059,963 B2 | * | 11/2011 | Kim et al. | 398/115 |
| 8,452,187 B2 | * | 5/2013 | Mazzochette et al. | 398/161 |
| 8,571,412 B2 | * | 10/2013 | Mazzochette et al. | 398/116 |
| 2004/0228632 A1 | * | 11/2004 | Maeda et al. | 398/85 |
| 2009/0245787 A1 | * | 10/2009 | Fee et al. | 398/29 |
| 2010/0304686 A1 | * | 12/2010 | Kennedy et al. | 455/67.11 |
| 2012/0141133 A1 | * | 6/2012 | Mazzochette et al. | 398/130 |

(Continued)

*Primary Examiner* — Agustin Bello
(74) *Attorney, Agent, or Firm* — Lowenstein Sandler LLP

(57) ABSTRACT

An apparatus for simulating radio frequency (RF) signal propagation characteristics in a wireless communication network is disclosed. The apparatus includes a set of optical modulators in electrical communication with corresponding ones of a set of RF terminals. A set of optical demodulators is in optical communication with corresponding ones of the set of optical modulators and corresponding ones of the set of RF terminals. A set of optical delay lines may be configured to be in optical communication with the corresponding ones of the set of optical modulators and the corresponding ones of the set of optical demodulators.

26 Claims, 15 Drawing Sheets

(56) References Cited

U.S. PATENT DOCUMENTS

| | | | |
|---|---|---|---|
| 2012/0230683 A1* | 9/2012 | Lacatus et al. | 398/38 |
| 2012/0294621 A1* | 11/2012 | Mazzochette et al. | 398/115 |
| 2013/0064550 A1* | 3/2013 | Mazzochette et al. | 398/116 |
| 2013/0202295 A1* | 8/2013 | Mazzochette et al. | 398/45 |

* cited by examiner

BI-DIRECTIONAL, COMPACT, MULTI-PATH AND FREE SPACE CHANNEL REPLICATOR

CROSS-REFERENCE TO RELATED APPLICATIONS

This application claims the benefit of U.S. provisional patent application No. 61/486,529 filed May 16, 2011, the disclosure of which is incorporated herein by reference in its entirety.

FIELD OF THE INVENTION

The present invention relates generally to an apparatus for simulated testing of wireless communications networks, and more particularly, to an apparatus that employs radio electrical-to-optical-to-electrical components configured to perform optical signal processing to simulate radio frequency (RF) signal propagation characteristics in a wireless communication network.

BACKGROUND OF THE INVENTION

The explosion of wireless digital communication networks and equipment has created a need for compressing more information into a finite spectrum. There is also a need for greater security in communications for both military and commercial applications. As a result, system architecture designers have been prompted to develop wireless communication systems that have increasingly complex modulation, timing, and encryption schemes. Throughout the communication system development process, it is necessary to test system performance by measuring the reliability of transmission and reception of information in the presence of multiple transceivers, in different locations, at different power levels, in the presence of unwanted interferers, reflecting obstacles, and under a variety of environmental conditions. A rapidly operating and sophisticated test apparatus is needed to optimize a transmission system under development and to perform a preliminary qualification of the system prior to expensive and time-consuming field trials.

Prior art test systems for rapid testing between two or more transceivers have included system emulators. A system emulator produces an output that is based upon a pre-programmed emulator response, an input signal, and selected emulator setting (e.g., distance, environment, other transceivers, etc.). Unfortunately, system emulators require information about the system under test in order to produce an accurate output. This requirement presents several problems. First, a new system emulator may need to be designed for each new modulation scheme type for the transmission system under test (SUT). Secondly, a system emulator may introduce errors that produce false positives or negatives in the performance of the SUT. Finally, a system emulator may not replicate a communication environment accurately as a result of interactions between multiple signals at different distances and power levels, thereby resulting in erroneous emulator output(s).

Accordingly, what would be desirable, but has not yet been provided, is an apparatus for simulating RF signal propagation characteristics in a wireless communication network that overcomes the deficiencies of prior art system emulators.

SUMMARY OF THE INVENTION

The above-described problems are addressed and a technical solution is achieved in the art by providing an apparatus for simulating RF signal propagation characteristics in a wireless communication network, the apparatus comprising: a first RF terminal; a second RF terminal; a first optical modulator in electrical communication with the first RF terminal; an optical delay line in optical communication with the first optical modulator; a first optical demodulator in optical communication with the optical delay line and in electrical communication with the first RF terminal; a second optical demodulator in optical communication with the optical delay line and in electrical communication with the second RF terminal; and a second optical modulator in electrical communication with the second RF terminal and in optical communication with the optical delay line. The apparatus may further comprise: a first optical filter in optical communication with the optical delay line and the a first optical demodulator; and a second optical filter in optical communication with the optical delay line and the second optical demodulator; wherein: the first optical modulator is configured to transmit a first wavelength; the first optical filter is configured to transmit a second wavelength; the second optical filter is configured to transmit the first; and the second optical modulator is configured to transmit the second wavelength.

According to an embodiment of the present invention, the first optical modulator and the second optical modulator may each comprise: an RF isolator; a laser modulator in electrical communication with the RF isolator; and a circulator in optical communication with the laser modulator. The first optical demodulator and the second optical demodulator may each comprise: a dispersion compensator in optical communication with the circulator; a detector in optical communication with the dispersion compensator; and a gain stage in optical communication with the detector and in electrical communication with the RF isolator.

In an embodiment, the bi-directional optical modulator/demodulator may operate at different wavelengths (for example 1550 and 1551 nm) to avoid demodulation products that fall in the radio operating frequency band. The modulator/demodulator may include a distributed feedback (DFB) laser or a fixed laser and external modulator (mach zehnder).

According to an embodiment of the present invention, the optical delay line produced may be a fixed delay or a variable delay. The optical delay line may comprise: a plurality of optical delay lines configured in a series configuration, wherein a delay associated with each of the plurality of optical delay lines increases progressively; a plurality of bypass stubs each associated with a corresponding one of the plurality of optical delay lines; a plurality of two-position optical switches each configured to switch between one of the plurality of optical delay lines and a corresponding one of the plurality of bypass stubs; a global bypass stub associated with an input and an output of the plurality of optical delay lines arranged in a series configuration; and at least one two-position optical switch configured to switch between the global bypass stub associated with the plurality of optical delay lines and at least one of the plurality of bypass stubs and the plurality of optical delay lines. The optical delay line may comprise: a plurality of optical delay lines configured in a parallel configuration, wherein a delay of each of the plurality of optical delay lines increases progressively; and at least one multi-position optical switch configured to switch among each of the plurality of optical delay lines.

According to an embodiment of the present invention, the apparatus may further comprise a variable radio frequency (RF) attenuator in electrical communication with an RF portion of at least one of the first optical modulator, the second optical modulator, the first optical demodulator, and the second optical demodulator. The apparatus may further comprise
} a variable optical attenuator in optical communication with an optical portion of at least one of the first optical modulator, the second optical modulator, the first optical demodulator, and the second optical demodulator.

According to an embodiment of the present invention, the apparatus may further comprise a third RF terminal; a fourth RF terminal; a third optical modulator in electrical communication with the third RF terminal; a second optical delay line in optical communication with the third optical modulator; a third optical demodulator in optical communication with the second optical delay line and in electrical communication with the third RF terminal; a fourth optical demodulator in optical communication with the second optical delay line and in electrical communication with the fourth RF terminal; a fourth optical modulator in electrical communication with the fourth RF terminal and in optical communication with the second optical delay line; a variable radio frequency (RF) attenuator in electrical communication with an RF portion of at least one of the third optical modulator, the fourth optical modulator, the third optical demodulator, and the fourth optical demodulator; a variable optical attenuator in optical communication with an optical portion of at least one of the third optical modulator, the fourth optical modulator, the third optical demodulator, and the fourth optical demodulator; and at least one switch configured to switch between the first RF terminal and the third RF terminal. The apparatus may further comprise: a second optical delay line in optical communication the first optical modulator; and a second variable optical attenuator in optical communication with the second optical delay line and the second a second optical modulator.

The above-described problems are addressed and a technical solution is achieved in the art by providing a multi-directional path propagation replicator (PPR) apparatus for simulating RF signal propagation characteristics in a wireless communication network, the apparatus comprising: an RF terminal; a first optical modulator in electrical communication with the RF terminal; an optical delay line in optical communication with the first optical modulator; a first optical demodulator in optical communication with the optical delay line and in electrical communication with the RF terminal; and an N-way optical combiner in optical communication with the optical delay line, wherein N is at least two. The N-way optical combiner may comprise a plurality of 1:N−1 optical splitter-combiners, wherein each of the plurality of 1:N−1 optical splitter-combiners is in optical communication with another of the plurality of 1:N−1 optical splitter-combiners.

According to an embodiment of the present invention, the apparatus may further comprise a second RF terminal; a second optical modulator in electrical communication with the second RF terminal; a second optical delay line in optical communication with the second optical modulator and the N-way optical combiner; a second optical demodulator in optical communication with the second optical delay line and in electrical communication with the second RF terminal.

The above-described problems are addressed and a technical solution is achieved in the art by providing a multi-directional path propagation replicator (PPR) apparatus for simulating RF signal propagation characteristics in a wireless communication network, the apparatus comprising: an RF terminal; an optical modulator in electrical communication with the RF terminal; an optical delay line in optical communication with the optical modulator; an optical demodulator in optical communication with the optical delay line and in electrical communication with the RF terminal; and an N×N RF switch matrix having a first input in electrical communication with the first optical modulator, wherein N is at least two. The apparatus may further comprise a 3-way optical splitter/combiner having a first input in optical communication with the optical delay line. The apparatus may further comprise a second optical demodulator in optical communication with a second input of the 3-way optical splitter/combiner and in electrical communication with a second input of the N×N RF switch matrix; and a second optical modulator in optical communication with the second input of the 3-way optical splitter/combiner and in electrical communication with the second input of the N×N RF switch matrix.

The above-described problems are addressed and a technical solution is achieved in the art by providing a multi-directional path propagation replicator (PPR) apparatus for simulating RF signal propagation characteristics in a wireless communication network, the apparatus comprising: a first RF terminal; a second RF terminal; a first optical modulator in electrical communication with the first RF terminal; a first optical delay line in optical communication with the first optical modulator; a first optical demodulator in optical communication with the first optical delay line and in electrical communication with the second RF terminal; a second optical modulator in electrical communication with the second RF terminal; a second optical delay line in optical communication with the second optical modulator; and a second optical demodulator in optical communication with the second optical delay line and in electrical communication with the first RF terminal.

The above-described problems are addressed and a technical solution is achieved in the art by providing an apparatus for simulating RF signal propagation characteristics in a wireless communication network, the apparatus comprising: a plurality of optical modulators in electrical communication with corresponding ones of a plurality of RF terminals; a plurality of optical demodulators in optical communication with corresponding ones of the plurality of optical modulators and corresponding ones of the plurality of RF terminals; and a plurality of optical delay lines configured to be in optical communication with the corresponding ones of the plurality of optical modulators and the corresponding ones of the plurality of optical demodulators.

The plurality of optical modulators, the plurality of optical demodulators, and the a plurality of optical delay lines may be arranged in a form of a complete graph, wherein corresponding ones of the plurality of optical modulators and corresponding ones of the optical demodulators are coupled to a plurality of vertices of the complete graph and wherein corresponding ones of the plurality of optical delay lines form edges between vertices of the complete graph. The complete graph may have n vertices and $$\frac{n(n-1)}{2}$$

edges, wherein n is at least two. The complete graph may be two-dimensional or three dimensional.

The apparatus may further comprise a plurality of N-way optical splitter-combiners having an input and n−1 outputs, wherein n is at least two, wherein an input of each of the plurality of N-way optical splitter-combiners is optically coupled to a corresponding one of the plurality of optical modulators and a corresponding one of the plurality of optical demodulators, and wherein the n−1 outputs of the plurality of N-way optical splitter-combiners is optically coupled to n−1 optical delay lines of the plurality of optical delay lines.

The apparatus may further comprise a plurality of N-way optical splitter-combiners having an input and n−1 outputs, wherein n is at least two, wherein an input of each of the plurality of N-way optical splitter-combiners is optically coupled to a corresponding one of the plurality of optical modulators and a corresponding one of the plurality of optical demodulators, and wherein the n−1 outputs of the plurality of N-way optical splitter-combiners are optically coupled to n−1 optical delay lines of the plurality of optical delay lines.

The apparatus may further comprise a plurality of optical attenuators in optical communication with corresponding ones of the plurality of optical delay lines, corresponding ones of the plurality of optical modulators, and corresponding ones of the plurality of optical demodulators. The optical attenuators may be fixed or variable optical attenuators. The optical delay lines may be fixed or variable optical delay lines.

The apparatus may further comprise at least one pair of a second variable optical attenuator and a second variable optical delay line coupled in series with each other and together in parallel with one of the plurality of optical attenuators operable to simulate a multi-path condition.

The above-described problems are addressed and a technical solution is achieved in the art by providing computer system for simulating radio frequency (RF) signal propagation characteristics in a wireless communication network, comprising: a memory; a processing device coupled to the memory, wherein the processing device is configured to provide a graphical user interface for operating an any of the multi-directional PPR apparatuses described above.

In one embodiment, the processing device controls a multi-directional PPR through direct electrical or optical connections. In another embodiment, the processing device controls the multi-directional PPR through a network which may be the Internet. The processing device may be configured to operate the plurality of N-way optical splitter-combiners, optical attenuators, relay switches, optical delay lines, etc. that constitute the multi-directional PPR using multi-directional PPR processing logic. The computer system may also control a plurality of radios.

The graphical user interface (not shown) may be configured under the control of the processing device to provide a map of radio coverage area. The computer system may be operable for selecting a position on the map for each of the plurality of radios. The graphical user interface may be configured under the control of the processing device to simulate movement of each of the plurality of radios. The processing device may be configured to record multiple scenarios of movement of each of the plurality of radios in the memory for later recall and play on the graphical user interface.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Embodiments of the present invention employ an exemplary apparatus for simulating RF signal propagation characteristics in a wireless communication network. Embodiments of the present invention replicate a radio transmission environment or channel, including the effects of propagation loss, reflections from one or more stationary or moving obstacles, ground and sea clutter, weather conditions, and other perturbations common to RF and microwave communication links. The apparatus provides for the simultaneous and uninterrupted transmission and reception of two or more transceivers. The exemplary apparatus simulates a variety of conditions for transceivers that may be mobile or stationary, ground, sea, or air based, and provides for variation in the distance between transceivers in real time with a continuous signal stream. The apparatus effectively provides a compact, lab-based simulator for a multi-node radio channel which may be used to test and verify performance of a variety of transmission schemes and modulation protocols.

Certain embodiments of the present invention replace a conventional system emulator with a system propagation path replicator (PPR). A PPR reproduces the propagation path associated with a particular communication system environment in terms of frequency range, frequency response, delay, loss, multipath, interferers, weather, multiple desired transceivers, and other conditions characteristic of the path. In addition, a PPR replicator needs to be compact so that it may be used in a laboratory setting. The cost of the PPR needs to be low relative to the expense of time-consuming field trials.

Figure 1:
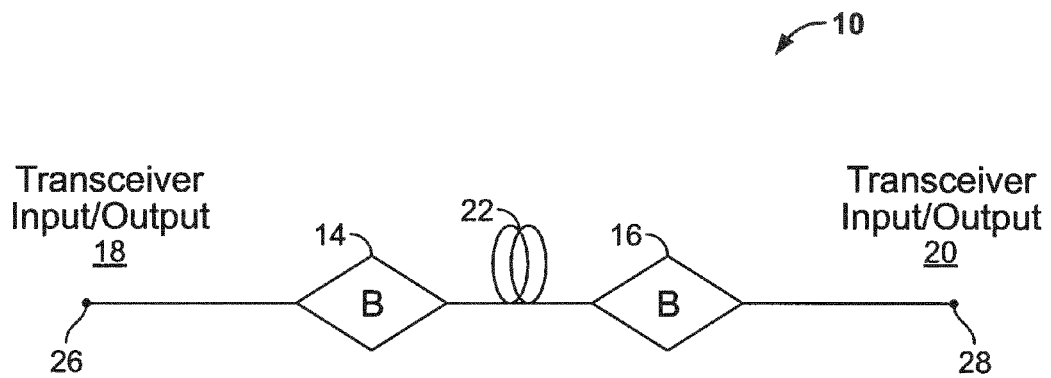
FIG. 1 is a circuit block diagram of an exemplary path propagation replicator (PPR), according to an embodiment of the present invention.

FIG. 1 is a circuit block diagram of an exemplary PPR 10, according to an embodiment of the present invention. The exemplary PPR 10 shown in FIG. 1 may be implemented as a fiber optic transmission lines configuration (herein the FOTL 10) that comprises a pair of bi-directional modulators/demodulators 14, 16, (i.e., a first and second bi-directional optical modulator/demodulator) that converts incoming or outgoing RF inputs/outputs of RF transceivers 18, 20 to/from an optical signal. The FOTL 10 of FIG. 1 provides for a single bi-directional link having a fixed delay and amplitude for the transceivers 18, 20. The optical signal is configured to propagate over the FOTL 10 in the form of a fiber optic delay line 22 having a predetermined transmission delay. An exemplary FOTL may have any one or combination of the following desired characteristics: (1) Low Loss (0.2 dB, single mode, 1550 nm); (2) Slow propagation velocity (1.5:1, reduced propagation rate requires less fiber for a given delay); (3) Low Dispersion (4 ps/nm-km, single mode, 1550 nm); (4) Small size (250 micron diameter for single mode fiber); (5) Light weight (0.5 kg/km); (6) Wide band width; (7) Rugged; (8) Low Cost ($50/km); and (9) Availability of low cost optical signal processing components (OSPC).

In operation, the transceivers 18, 20 are each respectively connected to one of the two PPR system ports 26, 28. An electrical signal emanating from one or both of the transceivers 18, 20 is converted to an optical signal by one or both of the bi-directional modulators/demodulators 14, 16, injected into the fiber optic delay line 22, and then converted back to an electrical signal by the other of the bi-directional modulators/demodulators 16, 14. The bi-directional modulators/demodulators 14, 16 (labeled "B") route the signals based on the transmission direction (e.g., from the fiber optic delay line 22 or from the transceiver 18). According to an embodiment of the present invention, signals may be transmitted and received in a full duplex mode. Since signals travel over the same the fiber optic delay line 22, channel characteristics (loss, delay, dispersion, etc.) are identical.

Figure 2A:
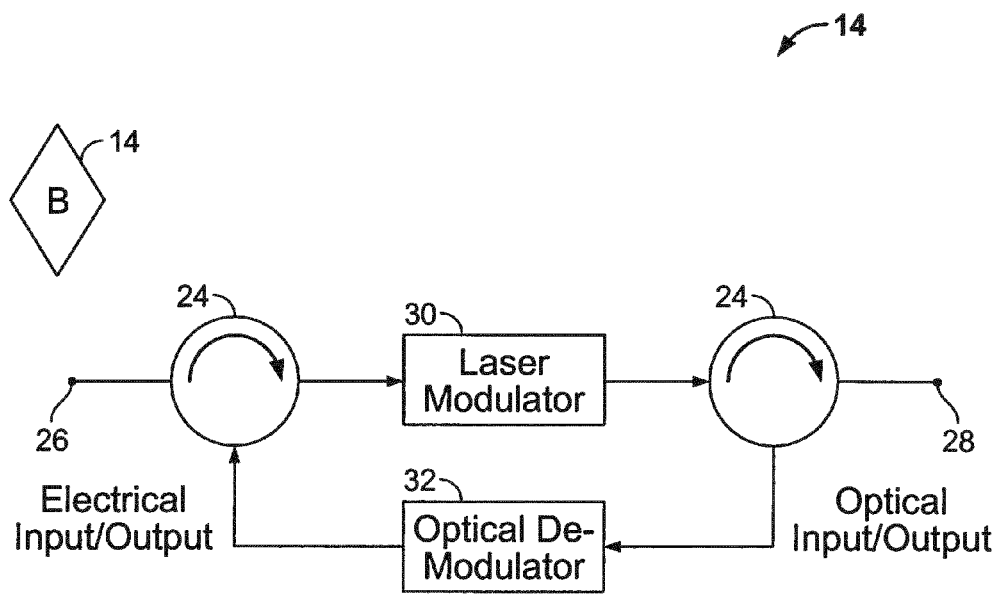
FIG. 2A shows a simplified schematic block diagram of the bi-directional modulators/demodulator of FIG. 1, according to an embodiment of the present invention.
Figure 2B:
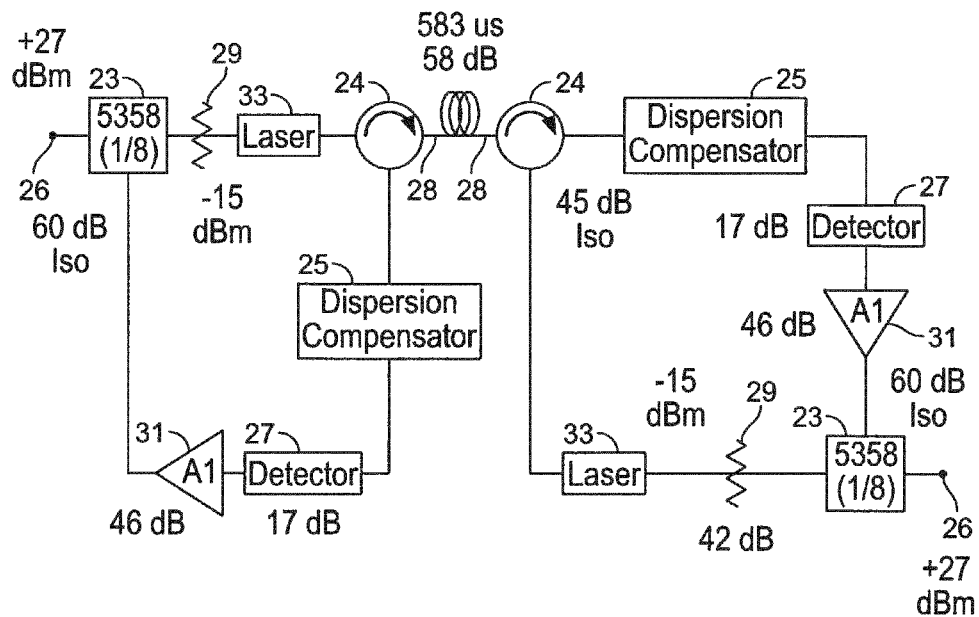
FIG. 2B shows a more detailed schematic block diagram of the bi-directional modulators/demodulator of FIGS. 1 and 2A, according to an embodiment of the present invention.

FIG. 2A shows a simplified schematic block diagram of the bi-directional optical modulator/demodulator 14 of FIG. 1, according to an embodiment of the present invention. FIG. 2B shows a more detailed schematic block diagram of the bi-directional modulators/demodulator of FIGS. 1 and 2A, according to an embodiment of the present invention. FIGS. 2A and 2B depict the routing scheme, which provides a required signal separation, and the modulation and demodulation of an electrical signal. The bi-directional optical modulator/demodulator 14 includes, a laser modulator 30 for converting an electrical signal received on an input port 26 to an optical signal transmitted via an output port 28. The laser modulator 30 comprises an RF isolator 23, a laser 33, and a circulator 24 for guaranteeing that a signal entering one port exits the next port. The bi-directional optical modulator/demodulator 14 further includes an optical demodulator 32 for converting an optical signal on an input port 28 to an electrical signal received on an output port 26. The optical demodulator 32 comprises includes the circulator 24, a dispersion compensator 25 to correct for portions of the laser signal arriving before other portions (dispersion), a detector 27, an electrical gain stage 31, and the RF isolator 23, connected as shown. The electrical gain stage 31 may be added to a detector 27 output to compensate for long delay loss. Attenuation devices 29 may be inserted after the output of the RF Isolator 23 to protect the laser 33. Additional isolators may be added to the detector output to reduce distortion and protect the detector from large transmit signals.

In an embodiment, the bi-directional optical modulator/demodulator 14 may operate at different wavelengths (for example 1550 and 1551 nm) to avoid demodulation products that fall in the radio operating frequency band. The modulator/demodulator 14 may include a distributed feedback (DFB) laser or a fixed laser and external modulator (mach zehnder).

Practical limitations of the electrical circulator construction of the bi-directional optical modulator/demodulator 14 of FIGS. 2A and 2B typically limit its useful electrical frequency range to one octave. Larger bandwidths can be achieved if the circulator 24 is replaced with a directional coupler at a cost of higher insertion loss.

The embodiments of the FOTL 10 shown in FIGS. 1 and 2A-2B each have a fixed optical delay. However, in many circumstances it is desirable to include a variable optical delay in the FOTL 10. A variable delay may be employed to simulate a moving transceiver, mimic weather effects (e.g., Doppler shift), or provide a range of channel distance tests. The variable optical delay may be continuous or discrete.

Figure 3:
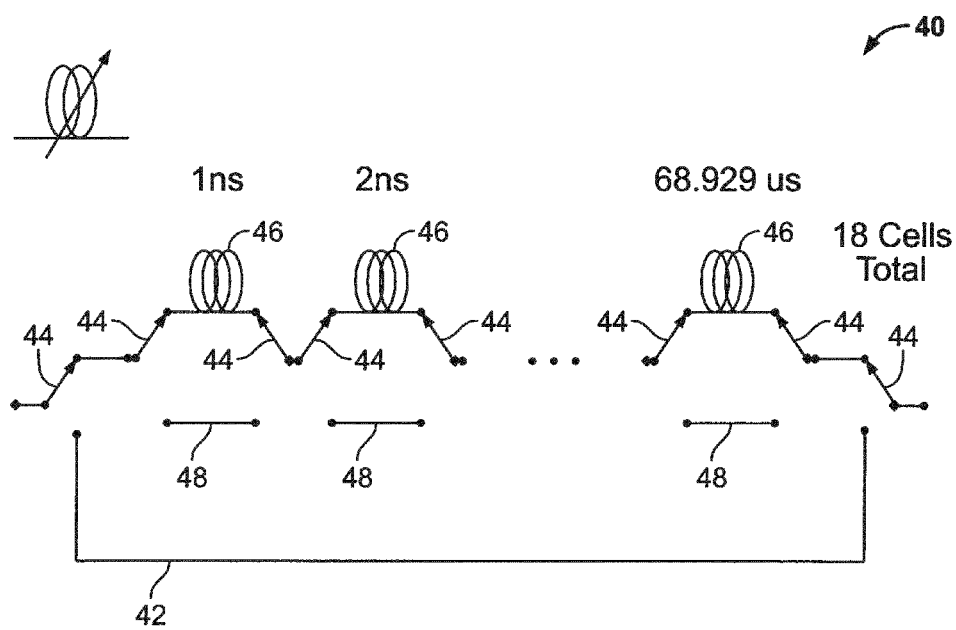
FIG. 3 depicts a schematic block diagram of an exemplary progressive or "continuous" variable optical delay line, according to an embodiment of the present invention.

FIG. 3 depicts a schematic block diagram of an exemplary progressive or "continuous" variable optical delay line 40, according to an embodiment of the present invention. The variable optical delay line 40 include a single optical bypass 42 having a fixed delay configured in parallel with a plurality of make-before-break optical switches 44, a plurality of fixed optical delay lines 46 each having increasing values of delay (i.e., from left to right), and a plurality of negligible delay bypass stubs 48. A variable delay is created by placing each one of the optical switches 44 in a position which adds a bypass stub 48 to a series chain or in a position which inserts a fixed optical delay line 46 in the series chain. The total delay is the series sum of the individual delays plus the delay associated with each delay bypass stub 48 included in the chain. The switching configuration is in a make-before-break arrangement to provide uninterrupted transmission and reception.

Figure 4:
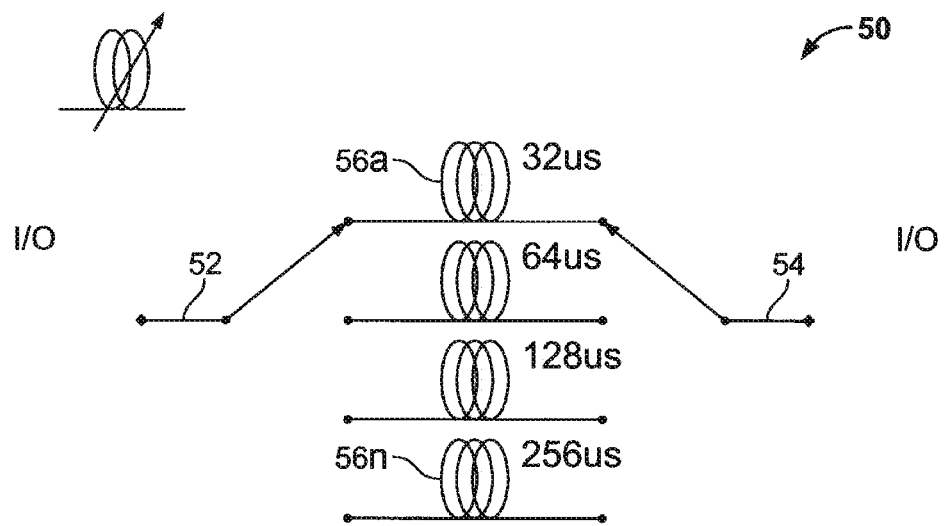
FIG. 4 depicts a schematic block diagram of an exemplary "discrete" variable optical delay line, according to an embodiment of the present invention.

FIG. 4 depicts a schematic block diagram of an exemplary "discrete" variable optical delay line 50, according to an embodiment of the present invention. The discrete variable optical delay line 50 include a pair of multiple position make-before-break optical switches 52, 54 and a plurality of fixed optical delay lines 56a-56n, each having increasing values of delay (i.e., from top to bottom) and arranged in a parallel configuration. A variable delay is created by placing each one of the optical switches 52, 54 in a matching position to insert one of the fixed optical delay lines 56a-56n in the path of input/output. The total delay is the value of the individual selected delay line. Switching needs to be make-before-break to provide uninterrupted transmission and reception.

Figure 5:
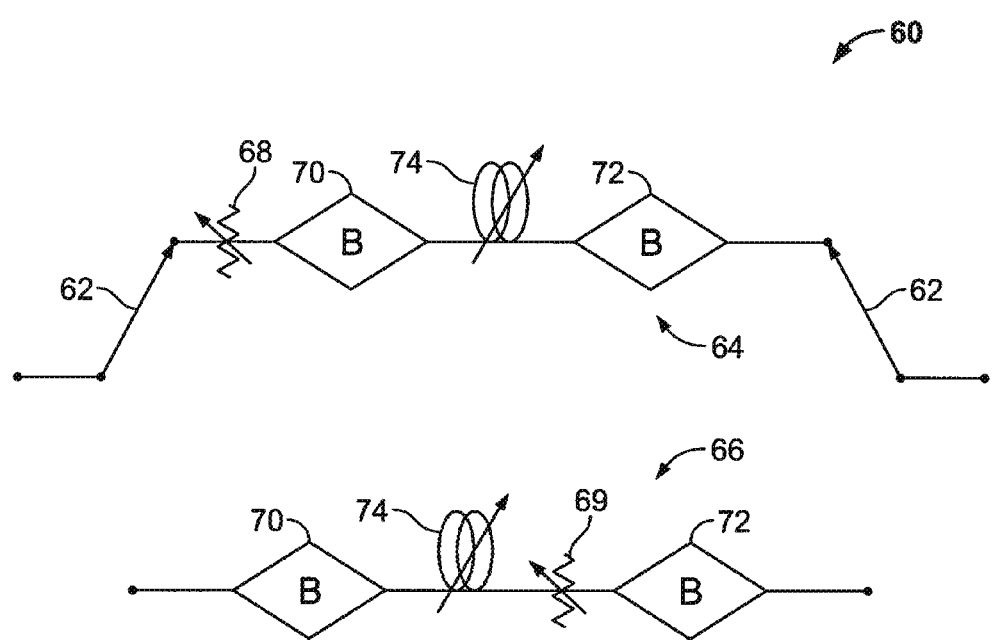
FIG. 5 depicts a bi-directional PPR for two transceivers with fixed or variable delay and amplitude control, according to an embodiment of the present invention.

FIG. 5 depicts a bi-directional PPR 60 for two transceivers with fixed or variable delay and amplitude control, according to an embodiment of the present invention. The PPR 60 includes a pair of make-before-break switches 62 that select between an RF attenuator 64 and an optical attenuator 66. Switching needs to be make-before-break to provide uninterrupted transmission and reception.

Each of the attenuators 64, 66 includes a series connection of an RF or optional attenuation device 68, 69, respectively, a pair of bi-directional modulators/demodulators 70, 72 having the same design as depicted in FIGS. 1 and 2, and a fixed or variable optical delay line 74 having a design as depicted in one of FIG. 3 or 4 and inserted between the pair of bi-directional modulators/demodulators 70, 72 in the optical path shown. One of the attenuators 64, 66 is used to match channel loss.

Figure 6:
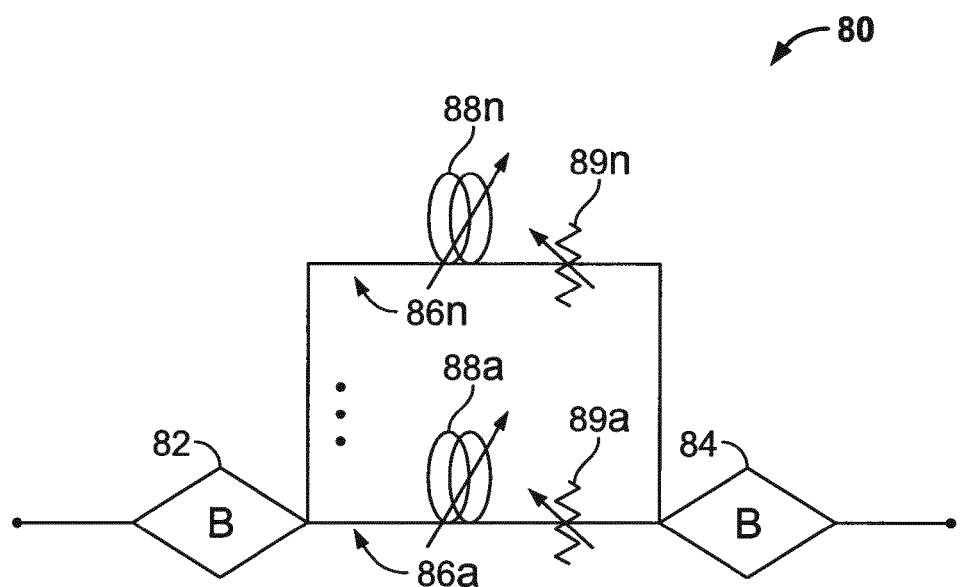
FIG. 6 depicts a bi-directional PPR for two transceivers with fixed or variable delay, amplitude control, and multipath transmission, according to an embodiment of the present invention.

FIG. 6 depicts a bi-directional PPR 80 for two transceivers with fixed or variable delay, amplitude control, and multipath transmission, according to an embodiment of the present invention. The PR 80 includes a pair of bi-directional modulators/demodulators 82, 84, and two or more optical paths 86a-86n, each including a fixed or variable optical delay line 88a-88n having a design as depicted in one of FIG. 3 or 4 and inserted between the pair of bi-directional modulators/demodulators 82, 84 in the optical path 86a-86n shown. Each of the optical paths 86a-86n may also include an optical attenuator 89a-89n. One of the paths 86a is designated as the primary path, while the one or more other paths 86b-86n may have variable attenuation and/or delay to match the effect of a weak signal reflected from different surfaces. The combined variation of attenuation and delay in each of the optical paths 86a-86n may be configured to simulate a moving or stationary multipath signal.

Figure 7:
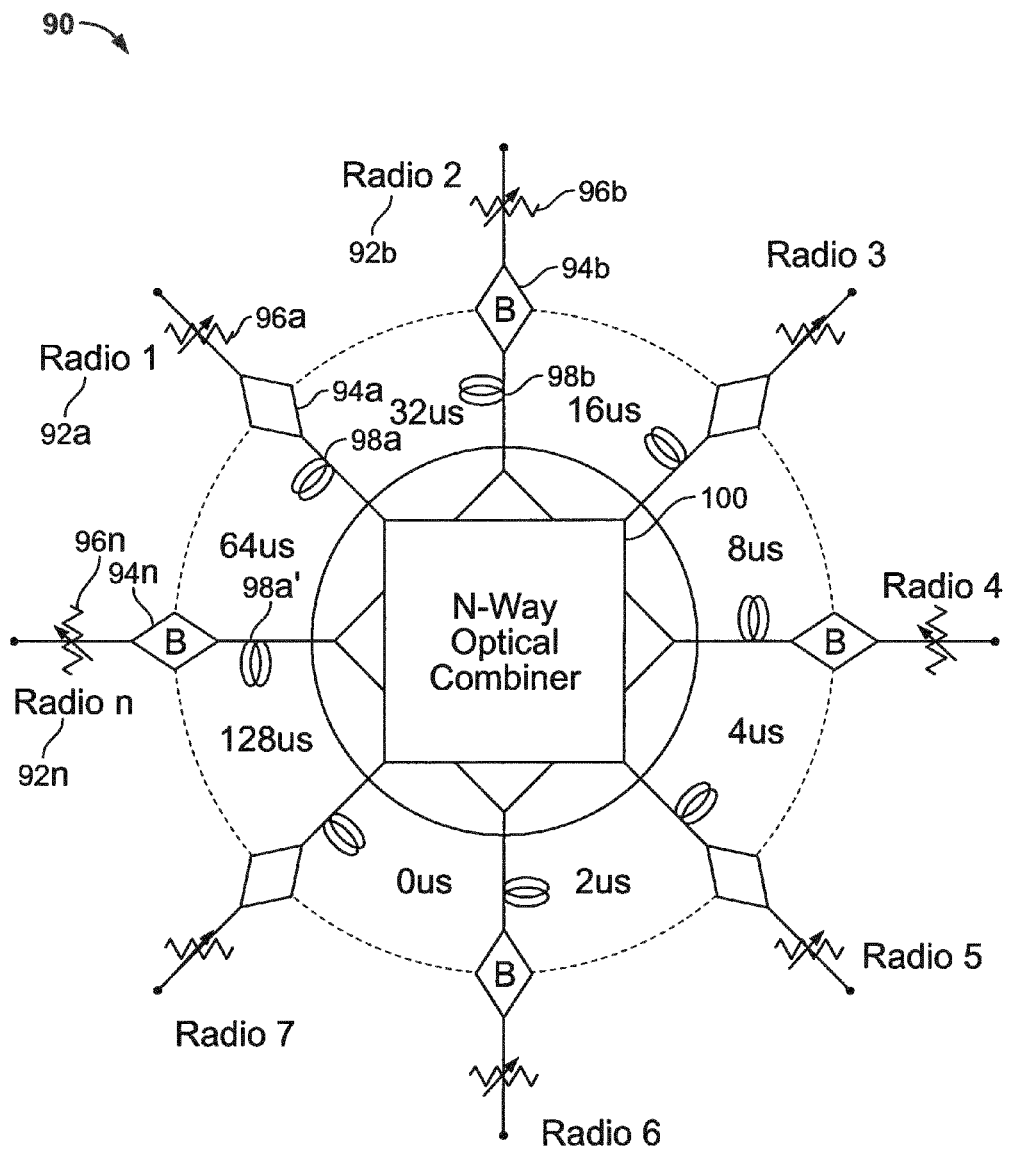
FIG. 7 depicts a multi-directional PPR for two to N transceivers with fixed or variable delay, amplitude control, and multipath transmission, according to an embodiment of the present invention.

FIG. 7 depicts a multi-directional PPR 90 for two to N transceivers with fixed or variable delay, amplitude control, and multipath transmission, according to an embodiment of the present invention. The N-way PPR 90 connects N radios 92a-92N via one each in series of a bi-directional transceiver 94a-94N with an RF attenuator 96a-96N and fixed optical delay line 98a-98N, respectively, as shown, to an N-way optical combiner 100 to be described hereinbelow in connection with FIG. 8. The N-way optical combiner 100 permits up to N radios to be connected to permit remote, programmable radio switching. In a preferred embodiment, N is eight. In a preferred embodiment, the delay values increase in powers of two from 0 μsec to $2^{N-1}$ μsec, although other values and increments for the delays may be employed. Attenuation values may be selected based on fiber and optical combiner losses. In a preferred embodiment, an RF attenuator is employed to reduce cost, but the RF attenuator may be replaced with an optical attenuator in an optical section. According to an embodiment of the present invention, the fixed delays shown in FIG. 7 may be replaced with variable optical delay lines and/or multipath simulators as depicted in FIG. 6 above, according to an embodiment of the present invention.

Figure 8:
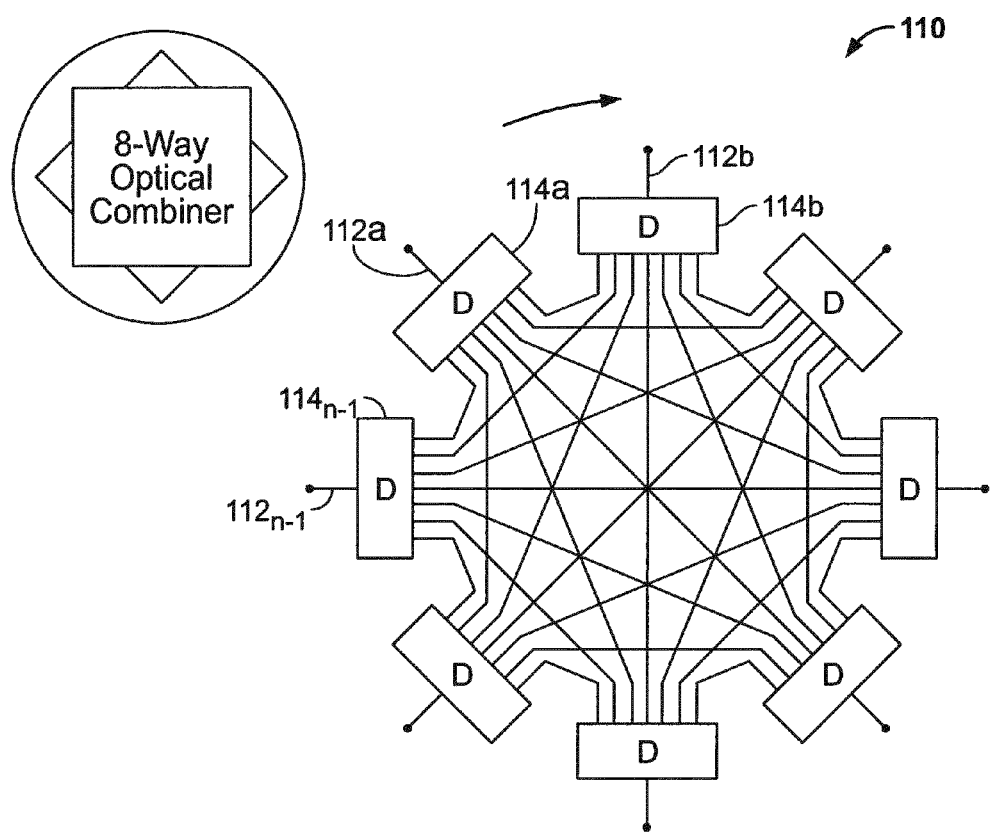
FIG. 8 depicts an N-way optical combiner for use in the multi-directional PPR of FIG. 7, according to an embodiment of the present invention.

FIG. 8 depicts an N-way optical combiner 110 for use in the multi-directional PPR 90 of FIG. 7, according to an embodiment of the present invention. In a preferred embodiment N is 8. Each port 112a-112$_{N-1}$ is configured to receive a bi-directional optical signal that originates from a radio transceiver, and is switched by a 1:N−1 optical splitter-combiner 114a, also labeled D, to any one of the other N−1 ports via a direct optical connection to another of the 1:N−1 optical splitter-combiners 114b-114$_{N-1}$. In a preferred embodiment, the loss through any one of the splitter-combiners 114b-114$_{N-1}$ is no greater than about 11.5 dB. Directivity is at least 55 dB.

Figure 9:
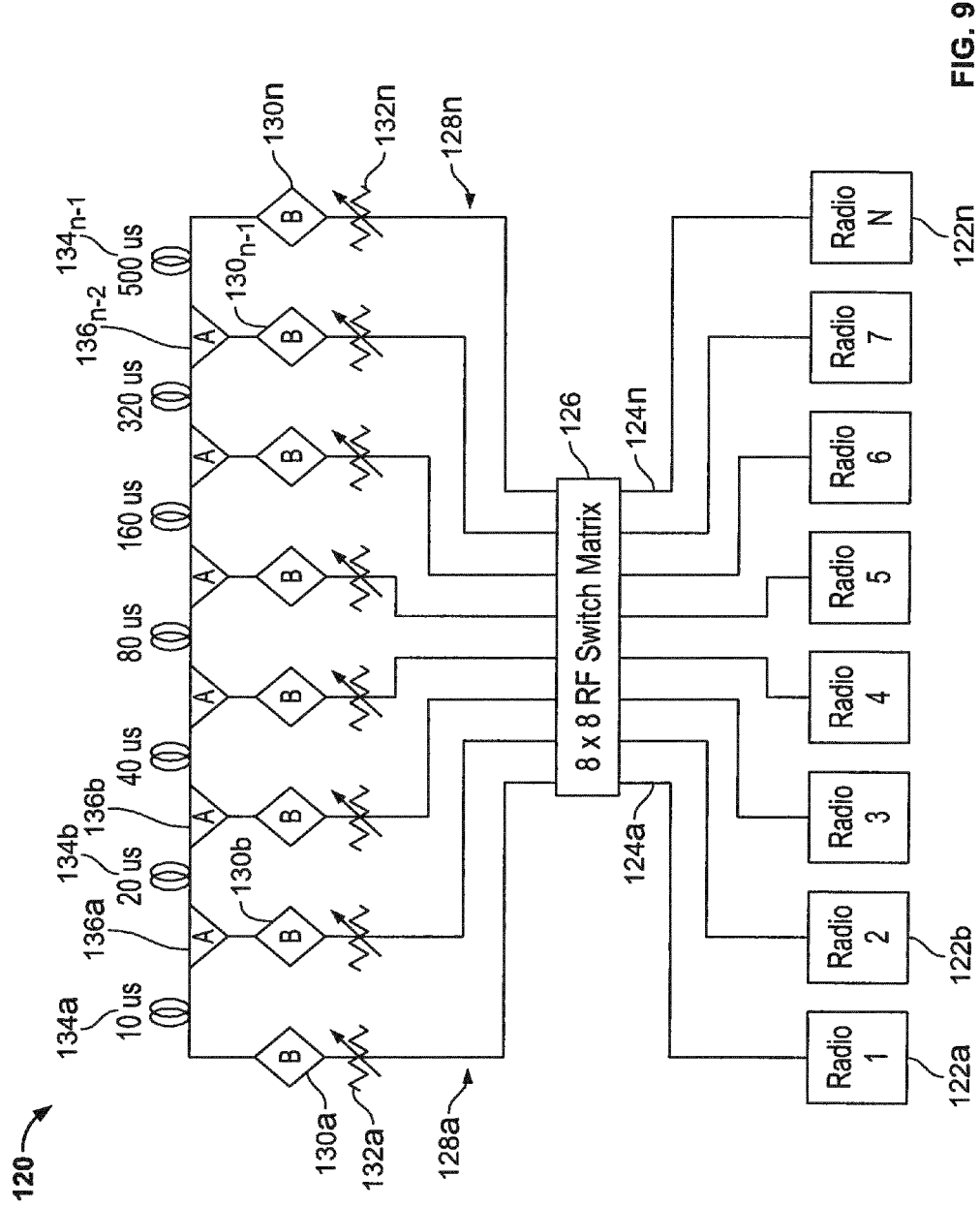
FIG. 9 depicts a second embodiment of a multi-directional PPR for two to N transceivers with fixed or variable delay, amplitude control, and multipath transmission, according to an embodiment of the present invention.

FIG. 9 depicts a second embodiment of a multi-directional PPR 120 for two to N transceivers with fixed or variable delay, amplitude control, and multipath transmission, according to an embodiment of the present invention. The N-way PPR 120 may connect up to N radios 122a-122N to each other via a plurality of corresponding input/output ports 124a-124N of an N×N RF switch matrix 126. In a preferred embodiment, N is eight. Each of the outputs 128a-128N of the N×N RF switch matrix 126 is connected though a set of N shunt paths 128a-128N, each including a bi-directional transceiver 130a-130N and an RF attenuator 132a-132N. The outer two of the bi-directional transceivers 130a, 130n are each connected directly to an optical attenuator 134a, 134$_{N-1}$, while the intervening bi-directional transceiver 130b-130$_{N-1}$ are each connected to one of two optical attenuators 134a-134$_{N-1}$ via one each of 3-way optical splitters 136a-136$_{N-2}$ to be described hereinbelow in connection with FIG. 10.

In a preferred embodiment, the value of a delay line increases from left to right across the multi-directional PPR 120 as shown, although other values and increments for the delays may be employed. In a preferred embodiment, an RF attenuator 132a-132N and the N×N RF switch matrix 126 are employed to reduce cost, but the RF attenuators 132a-132N may be replaced with optical attenuators in the optical sections. Attenuation values are programmably selected to compensate for propagation loss through each of the shunt paths 128a-128N. The splitting and delay losses are not equal through all of the shunt paths 128a-128N, but may be balanced by employing variable values for attenuation in the RF attenuators 132a-132N. Another reason for adding RF attenuators 132a-132N to the shunt paths 128a-128N is to control the amplitude of a signal through a shunt path 128a-128N and to prevent un-wanted loop oscillation for cross-node connections. The RF attenuators 132a-132N also reduce/control the level of the reflected signal back to each of the radios 122a-122N.

Figure 10:
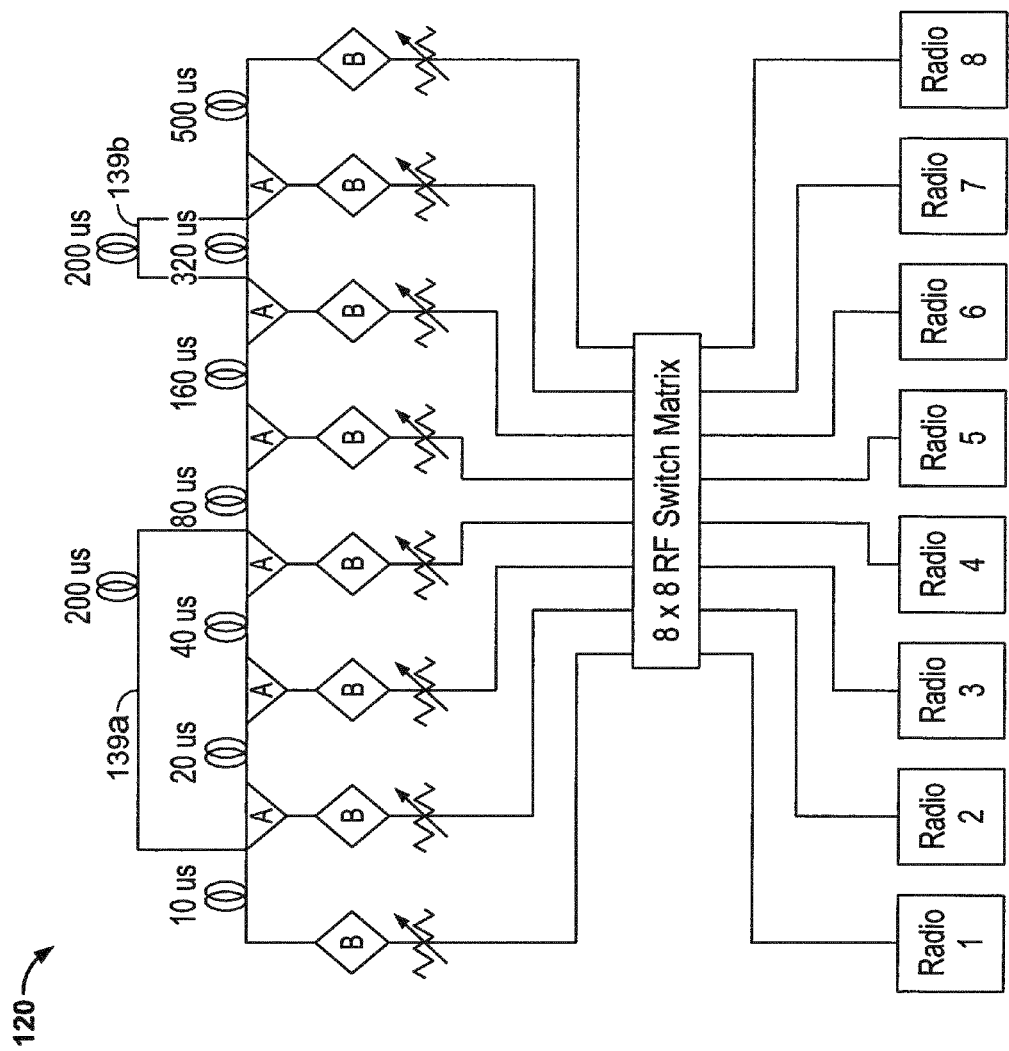
FIG. 10 depicts an exemplary implementation of multipath connections for the circuit of FIG. 9 using parallel delay paths, according to an embodiment of the present invention.

According to an embodiment of the present invention, multipath between the radios 122a-122N may be simulated using parallel delay paths 139a, 139b as shown in FIG. 6 above and FIG. 10. In such circumstances, additional optical splitters (not shown) may be required at junctions of the 3-way optical splitters 136a-136$_{N-2}$.

Figure 11:
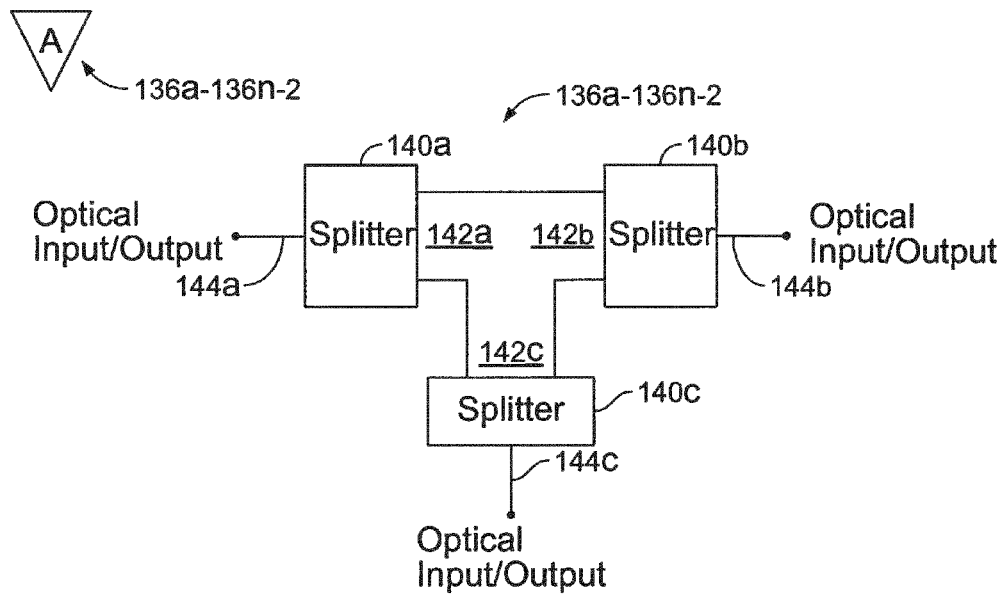
FIG. 11 is a detailed block diagram of a 3-way optical splitter/combiners, according to an embodiment of the present invention.

FIG. 11 is a detailed block diagram of a 3-way optical splitter/combiners 136a-136$_{N-2}$, according to an embodiment of the present invention. The 3-way optical splitter/combiner 136a-136$_{N-2}$ comprises three, 1:2 bi-directional optical splitters 140a-140c connected as shown such that the "2" side 142a-142c of each of the optical splitters 140a-140c is connected to two other "2" sides 142a-142c of each of the other optical splitters 140a-140c. The "1" sides 144a-144c of the optical splitters 140a-140c function as I/O of the overall 3-way optical splitter/combiner 136a-136$_{N-2}$.

Figure 14:
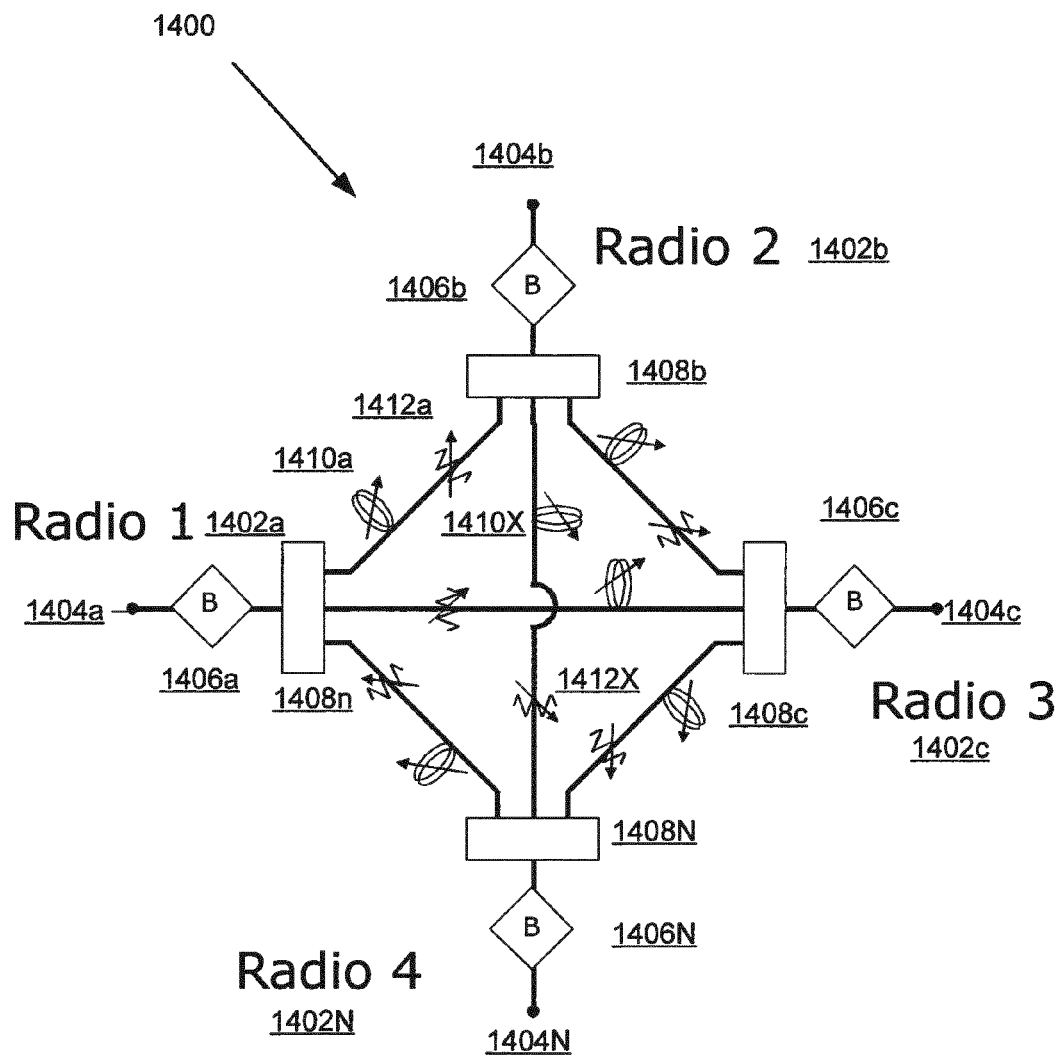
FIG. 14 depicts a third embodiment of a multi-directional PPR for two to N transceivers with fixed or variable delay, amplitude control, and multipath transmission, according to an embodiment of the present invention.

FIG. 14 depicts a third embodiment of a multi-directional PPR 1400 for two to N transceivers with fixed or variable delay, amplitude control, and multipath transmission, according to an embodiment of the present invention. The N-way PPR 1400 may connect up to N radios 1402a-1402N to each other via a plurality of corresponding input/output ports 1404a-1404N. Each of the ports 1404a-1404N is coupled to a corresponding one of N bi-directional transceivers 1406a-1406N. Each bi-directional transceiver (e.g., 1406a) is coupled to N−1 other of bi-directional transceivers 1406b-

1406N through an intervening 1:N−1 optical splitter combiner (e.g., 1408a of 1408a-1408N) and N−1 branches that may include in each branch a fixed or variable optical attenuator (e.g., 1410a of 1410a-1410X) and may include a fixed or variable optical delay line (e.g., 1412a of 1412a-1412X). In the embodiment shown, N is four (4).

More generally, the number of connections that exist among the N radios 1402a-1402N matches the number of paths between all of the radios in the multi-directional PPR 1400. If there are "n" network radios, then the total number of paths in the network is given by:

$$\text{Number of paths} = \sum_{i=1}^{n-1}(i)$$

$n$ = number of radios

The following table provides a summary of the paths required for different network configurations:

| Number of Radios | Number of Required Delay Paths |
|---|---|
| 2 | 1 |
| 3 | 3 |
| 4 | 6 |
| 5 | 10 |
| 6 | 15 |
| 7 | 21 |
| 8 | 28 |

Figure 15A:
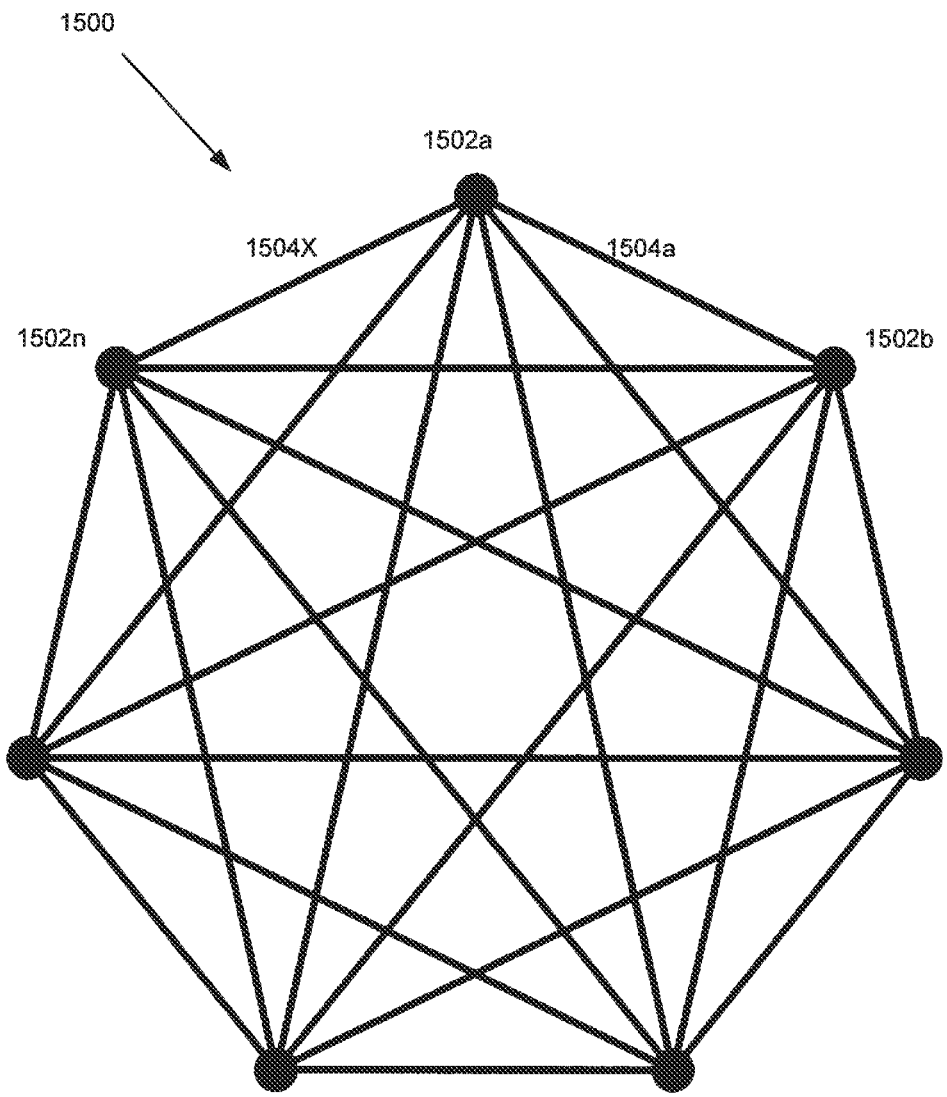
FIG. 15A depicts an idealized arrangement of the architecture of the multi-directional PPR in a form of a complete graph.
Figure 15B:
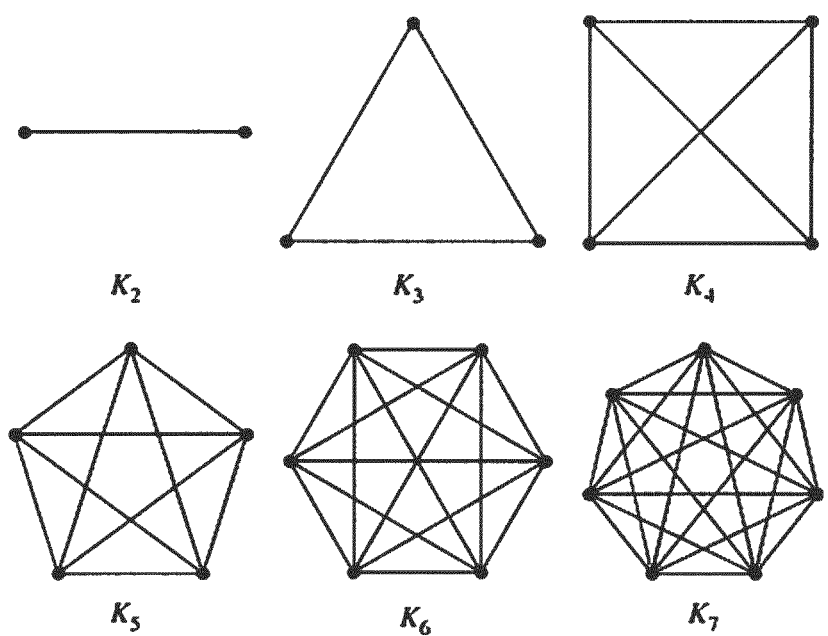
FIG. 15B depicts a number realizations of the complete graph architecture of the multi-directional PPR of FIG. 14 when n (or $K_n$) ranges from two to seven.

FIG. 15A depicts an idealized arrangement of the architecture of the multi-directional PPR in a form of a complete graph 1500. One each of the bi-directional transceivers 1406a-1406N of FIG. 14 is coupled to vertex (e.g., 1502a of 1502n) of the complete graph 1500 corresponding to each of the input/output ports 1404a-1404n of FIG. 14. Each of the $$\frac{n(n-1)}{2}$$

edges 1504a-X may be formed of one of the fixed or variable optical delay lines (e.g., 1412a of 1412a-1412X) and/or fixed or variable optical attenuator (e.g., 1410a of 1410a-1410X). n is at least two (2). FIG. 15B depicts a number realizations of the complete graph 1500 architecture of the multi-directional PPR 1400 when n (or $K_n$) ranges from two to seven.

In one embodiment, the complete graph 1500 may be planar or two-dimensional; in another embodiment, the complete graph may be three-dimensional. In still another embodiment, multi-path may be added by employing shunt paths across one or more of the direct branches/paths as shown above in FIG. 6.

Figure 16:
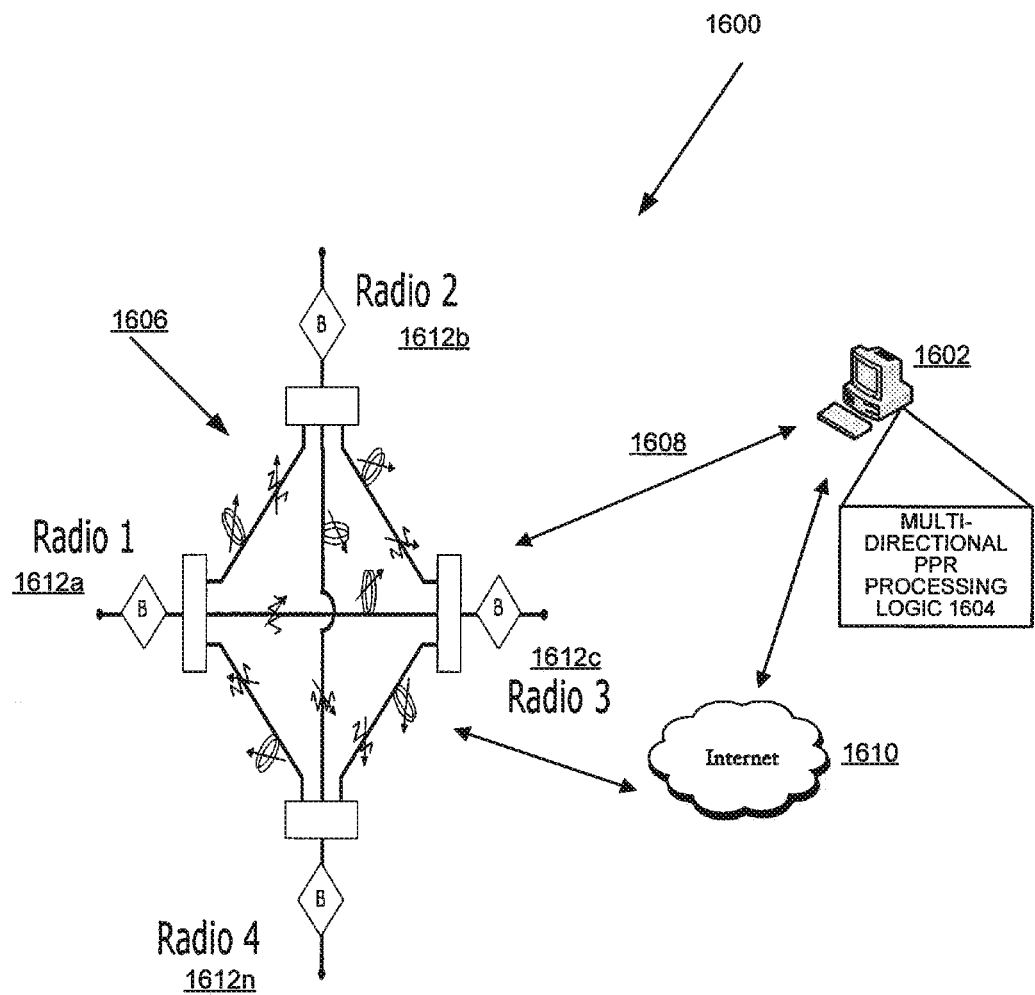
FIG. 16 is a block diagram of computer system for simulating radio frequency (RF) signal propagation characteristics in a wireless communication network, according to an embodiment of the present invention.

FIG. 16 is a block diagram of computer system 1600 for simulating radio frequency (RF) signal propagation characteristics in a wireless communication network according to an embodiment of the present invention. The computer system 1600 may include a processing device 1602 to be described below in FIG. 17, configured to provide a graphical user interface (GUI) for operating an apparatus 1606 that may comprise any of the embodiments of the multi-directional PPR's 1606 for two to N transceivers with fixed or variable delay, amplitude control, and multipath transmission described above. In one embodiment, the processing device 1602 controls the multi-directional PPR 1606 through direct electrical or optical connections 1608. In another embodiment, the processing device 1602 controls the multi-directional PPR 1606 through a network 1610 which may be the Internet. The processing device 1602 may be configured to operate the pluralities of N-way optical splitter-combiners, optical attenuators, relay switches, optical delay lines, etc. that constitute the multi-directional PPR 1606 using multi-directional PPR processing logic 1604. The computer system 1600 may also control a plurality of radios 1612a-1612n.

The graphical user interface (not shown) may be configured under the control of the processing device 1602 to provide a map of radio coverage area. The maps may be pre-loaded in the computer system 1600 or loaded externally from a source such as Google Maps. The map will show land, sea, and air positions. 3D and 2D viewers may be selectable.

The computer system 1600 may be operable for selecting a position on the map for each of the plurality of radios 1612a-1612n. For example, a ship-based radio may be located at sea, an aircraft radio at some altitude above the earth, etc. The locations may be selected using longitude, latitude, and altitude, or may be placed on the map using mouse drop-and-drag techniques.

The graphical user interface may be configured under the control of the processing device 1606 to simulate movement of each of the plurality of radios 1612a-1612n. For example, moving targets may be simulated by clicking on a radio position and selecting a "Start" point, and with a second click identifying a stop position. A third mouse-click selection may specify the radio speed. Once the simulation "run" command is given, each of the radios 1612a-1612n with mobile commands may move according to pre-programmed instructions.

The processing device 1602 may be configured to record multiple scenarios of movement of each of the plurality of radios 1612a-1612n in a memory for later recall and play on the graphical user interface.

Figure 17:
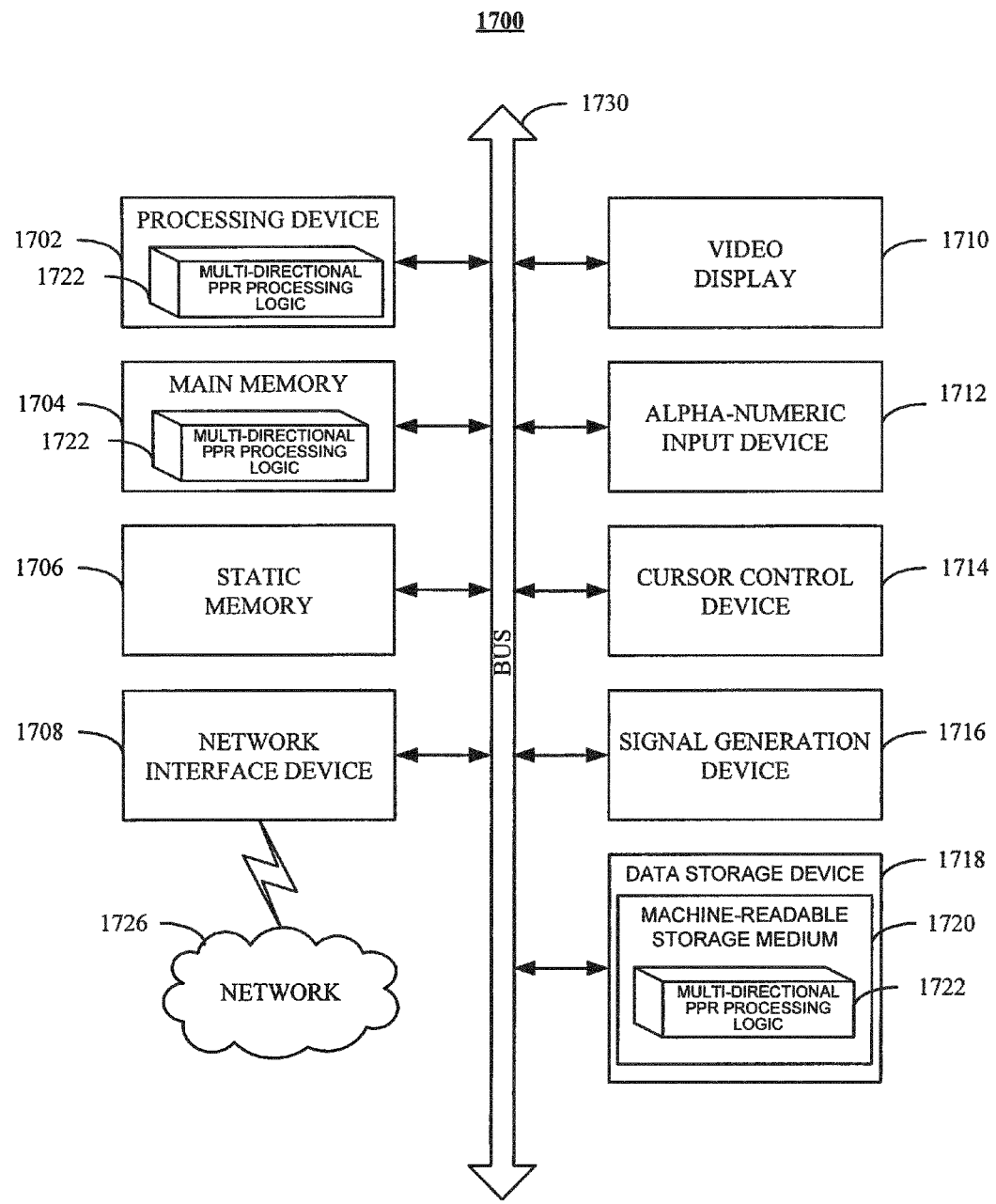
FIG. 17 illustrates a diagrammatic representation of a machine in the exemplary form of a computer system within which a set of instructions, for causing the machine to perform any one or more of the methodologies discussed herein, may be executed.

FIG. 17 illustrates a diagrammatic representation of a machine in the exemplary form of a computer system 1700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1700 includes a processing device 1702, a main memory 1704 (e.g., read-only memory (ROM), flash memory, dynamic random access memory (DRAM) (such as synchronous DRAM (SDRAM) or Rambus DRAM (RDRAM), etc.), a static memory 1706 (e.g., flash memory, static random access memory (SRAM), etc.), and a data storage device 1718, which communicate with each other via a bus 1730.

Processing device 1702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. Processing device 1702 is configured to execute the multi-directional PPR processing logic 1604, communicatively connected for performing the operations and steps discussed herein.

Computer system 1700 may further include a network interface device 1708. Computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1716 (e.g., a speaker).

Data storage device 1718 may include a machine-readable storage medium (or more specifically a computer-readable storage medium) 1720 having one or more sets of instructions 1722 (e.g., the multi-directional PPR processing logic 1604) embodying any one or more of the methodologies of functions described herein. The multi-directional PPR processing logic 1604 may also reside, completely or at least partially, within main memory 1704 and/or within processing device 1702 during execution thereof by computer system 1700; main memory 1704 and processing device 1702 also constituting machine-readable storage media. The multi-directional PPR processing logic 1604 may further be transmitted or received over a network 1726 via network interface device 1708.

Machine-readable storage medium 1720 may also be used to store the device queue manager logic persistently. While machine-readable storage medium 1720 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

Figure 12:
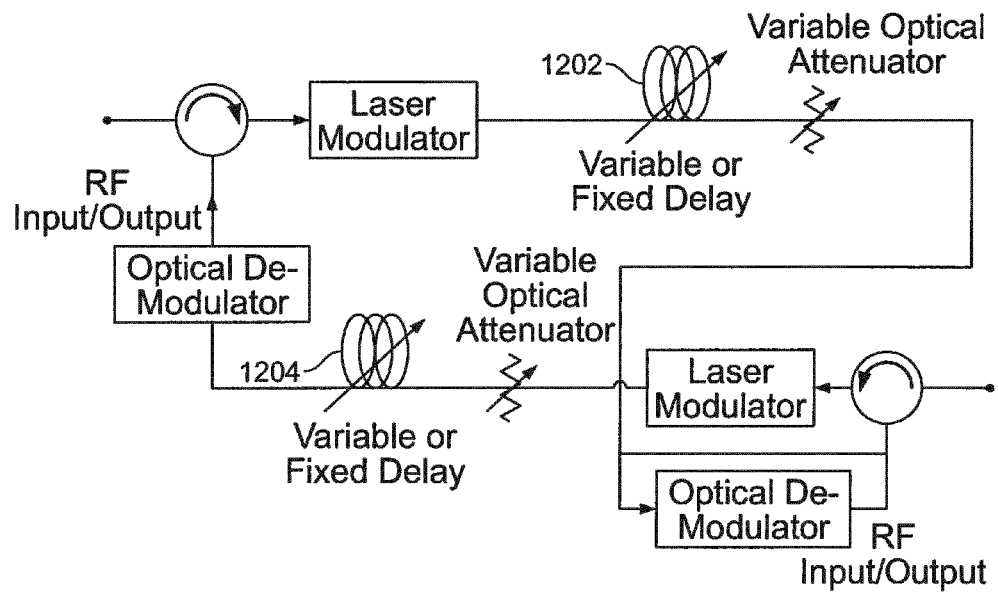
FIG. 12 shows a detailed schematic block diagram of a bi-directional optical modulator/demodulator with two separate fibers, according to an embodiment of the present invention.
Figure 13:
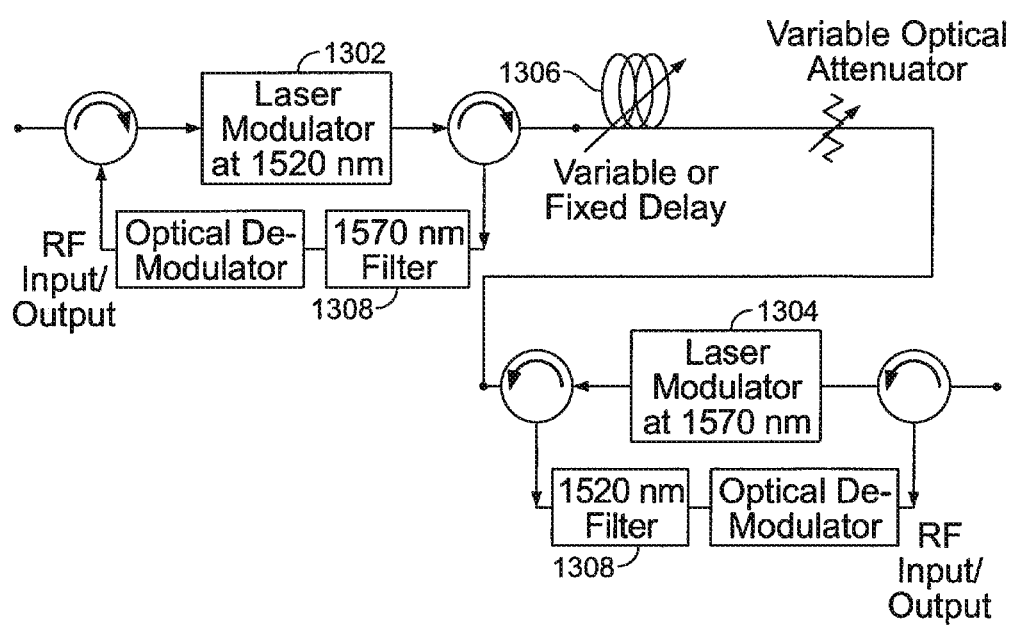
FIG. 13 shows a detailed schematic block diagram of a bi-directional optical modulator/demodulator with frequency discrimination, according to an embodiment of the present invention.

The present invention is subject to numerous variations. Optical isolation of the bi-directional optical modulator/demodulator of FIGS. 2A and 2B may be improved by employing two separate optical delay lines 1202, 1204 (e.g. 580 µsec), one for each direction as shown in FIG. 12. Additionally or alternatively, the bi-directional optical modulator/demodulator of FIGS. 2A and 2B may be improved by employing frequency discrimination as depicted in FIG. 13. FIG. 13 shows the inclusion of two separate 1520 nm and 1560 nm lasers 1302, 1304 along with additional optical fibers 1306, optical filters 1308 to discriminate optical frequencies, and optical amplifiers (Not shown in FIG. 13. See FIG. 2B). Dispersion may be reduced by the addition of dispersion compensation devices (Not shown in FIG. 13. See FIG. 2B), such as a fiber Bragg grating and/or a dispersion compensation fiber. Losses in certain embodiments of the present invention may be reduced by the addition of a free standing fiber coil (not shown), bi-directional fiber amplification, and the 1520 nm and 1560 nm lasers described above.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An apparatus for simulating radio frequency (RF) signal propagation characteristics in a wireless communication network, comprising:
   a first optical delay line;
   a first bi-directional optical modulator-demodulator in optical communication with the first optical delay line;
   a second bi-directional optical modulator-demodulator in optical communication with the first optical delay line;
   a second optical delay line in optical communication with the second bi-directional optical modulator-demodulator;
   a third bi-directional optical modulator-demodulator in optical communication with the second optical delay line; and
   a third optical delay line in optical communication with the third bi-directional optical modulator-demodulator and the first bi-directional optical modulator-demodulator.

2. The apparatus of claim 1, wherein each of the first bi-directional optical modulator-demodulator, the second bi-directional optical modulator-demodulator, and the third bi-directional optical modulator-demodulator comprises:
   an optical modulator having an RF terminal and an optical terminal; and
   an optical demodulator in electrical communication with the RF terminal and in optical communication with the optical terminal.

3. The apparatus of claim 1, further comprising: a first N-way optical splitter-combiner, a second N-way optical splitter-combiner, and a third N-way optical splitter-combiner,
   wherein n is at least two,
   wherein an input of a first N-way optical splitter-combiner is in optical communication with the first bi-directional optical modulator-demodulator, wherein a first output of the first N-way optical splitter-combiner is in optical communication with the first optical delay line, and wherein a second output of the first N-way optical splitter-combiner is in optical communication with the third optical delay line;
   wherein an input of a second N-way optical splitter-combiner is in optical communication with the second bi-directional optical modulator-demodulator, wherein a first output of the second N-way optical splitter-combiner is in optical communication with the first optical delay line, and wherein a second output of the second N-way optical splitter-combiner is in optical communication with the second optical delay line; and
   wherein an input of a third N-way optical splitter-combiner is in optical communication with the third bi-directional optical modulator-demodulator, wherein a first output of the third N-way optical splitter-combiner is in optical communication with the second optical delay line, and wherein a second output of the third N-way optical splitter-combiner is in optical communication with the third optical delay line.

4. The apparatus of claim 3, further comprising:
   a first optical attenuator in optical communication with the first optical delay line and the second N-way optical splitter-combiner;
   a second optical attenuator in optical communication with the second optical delay line and the third N-way optical splitter-combiner; and
   a third optical attenuator in optical communication with the third optical delay line and the first N-way optical splitter-combiner.

5. The apparatus of claim 4, wherein at least one of the first optical attenuator, the second optical attenuator, or the third optical attenuator is a variable optical attenuator.

6. The apparatus of claim 1, wherein at least one of the first optical delay line, the second optical delay line, or the third optical delay line has a fixed delay.

7. The apparatus of claim 1, wherein at least one of the first optical delay line, the second optical delay line, or the third optical delay line is a variable optical delay line.

8. The apparatus of claim 1, wherein at least one of the first optical delay line, the second optical delay line, or the third optical delay line comprises:
   a second plurality of optical delay lines configured in a series configuration, wherein a delay associated with each of the second plurality of optical delay lines increases progressively;
   a plurality of bypass stubs each associated with a corresponding one of the second plurality of optical delay lines;
   a plurality of two-position optical switches each configured to switch between one of the second plurality of optical delay lines and a corresponding one of the plurality of bypass stubs;
   a global bypass stub associated with an input and an output of the second plurality of optical delay lines arranged in a series configuration; and
   at least one two-position optical switch configured to switch between the global bypass stub associated with the second plurality of optical delay lines and at least one of the plurality of bypass stubs and the second plurality of optical delay lines.

9. The apparatus of claim 1, wherein at least one of the first optical delay line, the second optical delay line, or the third optical delay line comprises:
   a second plurality of optical delay lines configured in a parallel configuration, wherein a delay of each of the second plurality of optical delay lines increases progressively; and
   at least one multi-position optical switch configured to switch among each of the second plurality of optical delay lines.

10. The apparatus of claim 4, further comprising at least one pair of a second variable optical attenuator and a second variable optical delay line coupled in series with each other and together in parallel with at least one of the first optical attenuator, the second optical attenuator, or the third optical attenuator operable to simulate a multi-path condition.

11. The apparatus of claim 2, wherein at least one of the first optical modulator, the second optical modulator, or the third optical modulator comprises:
   an RF isolator;
   a laser modulator in electrical communication with the RF isolator; and
   a circulator in optical communication with the laser modulator.

12. The apparatus of claim 11, wherein at least one of the first optical demodulator, the second optical demodulator, or the third optical demodulator comprises:
- a dispersion compensator in optical communication with the circulator;
- a detector in optical communication with the dispersion compensator; and
- a gain stage in optical communication with the detector and in electrical communication with the RF isolator.

13. The apparatus of claim 2, wherein at least two of the first optical modulator, the second optical modulator, and the third optical modulator operate at different wavelengths.

14. The apparatus of claim 2, wherein at least one of the first optical demodulator, the second optical demodulator, or the third optical demodulator comprises a distributed feedback laser or a fixed laser and external modulator.

15. A computer system for simulating radio frequency (RF) signal propagation characteristics in a wireless communication network, comprising:
- a memory;
- a processing device, coupled to the memory, wherein the processing device is configured to provide a graphical user interface for operating an apparatus, comprising:
  - a first optical delay line;
  - a first bi-directional optical modulator-demodulator in optical communication with the first optical delay line;
  - a second bi-directional optical modulator-demodulator in optical communication with the first optical delay line;
  - a second optical delay line in optical communication with the second bi-directional optical modulator-demodulator;
  - a third bi-directional optical modulator-demodulator in optical communication with the second optical delay line; and
  - a third optical delay line in optical communication with the third bi-directional optical modulator-demodulator and the first bi-directional optical modulator-demodulator.

16. The system of claim 15, wherein the apparatus further comprises:
- a first N-way optical splitter-combiner, a second N-way optical splitter-combiner, and a third N-way optical splitter-combiner,
- wherein n is at least two,
- wherein an input of a first N-way optical splitter-combiner is in optical communication with the first bi-directional optical modulator-demodulator, wherein a first output of the first N-way optical splitter-combiner is in optical communication with the first optical delay line, and wherein a second output of the first N-way optical splitter-combiner is in optical communication with the third optical delay line;
- wherein an input of a second N-way optical splitter-combiner is in optical communication with the second bi-directional optical modulator-demodulator, wherein a first output of the second N-way optical splitter-combiner is in optical communication with the first optical delay line, and wherein a second output of the second N-way optical splitter-combiner is in optical communication with the second optical delay line; and
- wherein an input of a third N-way optical splitter-combiner is in optical communication with the third bi-directional optical modulator-demodulator, wherein a first output of the third N-way optical splitter-combiner is in optical communication with the second optical delay line, and wherein a second output of the third N-way optical splitter-combiner is in optical communication with the third optical delay line, and
- wherein the processing device is further configured to operate the first N-way optical splitter-combiner, the second N-way optical splitter-combiner, and the third N-way optical splitter-combiner.

17. The system of claim 16, wherein the apparatus further comprises:
- a first optical attenuator in optical communication with the first optical delay line and the second N-way optical splitter-combiner;
- a second optical attenuator in optical communication with the second optical delay line and the third N-way optical splitter-combiner;
- a third optical attenuator in optical communication with the third optical delay line and the first N-way optical splitter-combiner
- wherein the processing device is further configured to operate the first optical attenuator, the second optical attenuator, and the third optical attenuator.

18. The system of claim 15,
- wherein at least one of the first optical delay line, the second optical delay line, or the third optical delay line is a variable optical delay line and
- wherein the processing device is further configured to vary a value of the at least one of the first optical delay line, the second optical delay line, or the third optical delay line.

19. The system of claim 15, wherein the system further comprises:
- a first radio in signal communication with the first bi-directional optical modulator-demodulator;
- a second radio in signal communication with the second bi-directional optical modulator-demodulator; and
- a third radio in signal communication with the third bi-directional optical modulator-demodulator.

20. The system of claim 15, wherein the graphical user interface is configured under the control of the processing device to provide a map of radio coverage area.

21. The system of claim 20, wherein the system is operable to select a position on the map for the first radio, the second radio, and the third radio.

22. The system of claim 20, wherein the graphical user interface is configured under the control of the processing device to simulate movement of the first radio, the second radio, and the third radio.

23. The system of claim 22, wherein the processing device is configured to record multiple scenarios of movement of the first radio, the second radio, and the third radio in the memory for later recall and play on the graphical user interface.

24. The system of claim 15, wherein each of the first bi-directional optical modulator-demodulator, the second bi-directional optical modulator-demodulator, and the third bi-directional optical modulator-demodulator comprises:
- an optical modulator having an RF terminal and an optical terminal; and
- an optical demodulator in electrical communication with the RF terminal and in optical communication with the optical terminal.

25. The system of claim 24, wherein at least one of the first optical modulator, the second optical modulator, or the third optical modulator comprises:
- an RF isolator;
- a laser modulator in electrical communication with the RF isolator; and a circulator in optical communication with the laser modulator.

26. The system of claim 25, wherein at least one of first optical demodulator, the second optical demodulator, or the third optical demodulator comprises:
- a dispersion compensator in optical communication with the circulator;
- a detector in optical communication with the dispersion compensator; and
- a gain stage in optical communication with the detector and in electrical communication with the RF isolator.

* * * * *